United States Patent [19]

McGahan et al.

[11] 4,037,250
[45] July 19, 1977

[54] VIDEO SWITCHER

[76] Inventors: Everett G. McGahan; Charles L. Melanko, both of 2185 N. West St., Lima, Ohio 45805

[21] Appl. No.: 499,623

[22] Filed: Aug. 22, 1974

[51] Int. Cl.² .............................................. H04H 5/22
[52] U.S. Cl. ................................... 358/108; 358/181; 358/185
[58] Field of Search ................... 178/6, 6.8, DIG. 15, 178/DIG. 23, DIG. 38, DIG. 13; 340/147; 325/308; 179/2 TV; 358/85, 108, 181, 185

[56] References Cited

U.S. PATENT DOCUMENTS

| | | | |
|---|---|---|---|
| 3,194,880 | 7/1965 | Weingart | 178/6 |
| 3,511,926 | 5/1970 | Lami | 178/6 |
| 3,588,336 | 6/1971 | Scher | 178/6.8 |
| 3,594,496 | 7/1971 | Gabriel | 178/5.2 R |
| 3,757,039 | 9/1973 | Brewer | 178/6.8 |
| 3,816,662 | 6/1974 | Shaver et al. | 179/2 TV |
| 3,922,491 | 11/1975 | Bjork | 179/2 TV |
| 3,939,306 | 2/1976 | Mosca | 179/2 TV |

Primary Examiner—Robert L. Griffin
Assistant Examiner—Edward L. Coles

[57] ABSTRACT

A closed circuit video surveillance system having a plurality of camera stations which may be connected by entirely random and independent selection to a plurality of monitors located at different viewing stations without degradation of video quality. Each camera feeds its video signal over its own transmission line to a central switching station at which all camera signals are collected. Each viewing station has a monitor connected by a transmission line to an electromechanical switching means located in the central switching station. A selector switch is also located at the viewing station and is connected to the electromechanical switching means for controlling its operation. The electromechanical switching means switches the viewing station monitors into connection with selected cameras. Signal degradation is prevented, even if all viewing stations selected the same camera, by the use of a high impedance video amplifier and by switching in dummy input resistances to maintain a constant impedance condition.

12 Claims, 2 Drawing Figures

VIDEO SWITCHER

BACKGROUND OF THE INVENTION

The present invention generally relates to electronic video systems or closed circuit television and more particularly relates to a video surveillance apparatus which permits the complete random and independent selection of a plurality of camera signals by a plurality of monitoring stations.

The most elemental video surveillance system consists of a single camera permanently connected through a single coaxial transmission line to a single video monitor. Switching is unnecessary and only a single region may be viewed.

Such an elementary system may be modified to permit surveillance of multiple areas by utilizing a plurality of cameras each connected by coaxial transmission lines to a single viewing station. A simple switching device, such as a rotory switch, may be used to selectively connect any of the cameras to the monitor. The selection is random in that it makes no difference which camera is connected to the monitor. At all times, only one camera is connected to the only monitor allowing the system to be designed for this single condition. Consequently, signal conditions will always be identical. Of course, the signal from the unused cameras is of no consequence.

Problems arise however, when a surveillance system utilizes both multiple cameras and multiple viewing stations or monitors. If each viewing station is permitted to have independent and random access to all camera signals then it is apparent that the number of monitoring stations connected to any given camera can vary anywhere from one to the number of viewing stations in existence.

A problem arises through the existence of multiple cameras and multiple viewing stations. A particular camera may be progressively loaded down as more monitoring stations are connected to it. Thus, not only does the possibility exist that the fan out capacity of the video cameras will be exceeded thereby overloading the camera but also the possibility exists that variations in camera loading will occur even though an overload condition is not reached. There is therefore a need for a video surveillance system which can eliminate variation in the impedance conditions of circuits through which the video signal is coupled.

Ordinarily, in a multi-camera, multi-monitor system the video signal of each camera is fed directly to each viewing station. Each viewing station is also provided with suitable switching equipment for selecting the desired video signal from all fed-in camera signals.

One disadvantage of that system arises because coaxial transmission line is substantially more expensive than multiple conductor cable such as that which is used with low frequency or dc signals. There is therefore a need for a system which minimizes the total length of coaxial transmission line required for any given placement of camera and viewing stations.

SUMMARY OF THE INVENTION

The invention is a video surveillance apparatus which comprises a plurality of video cameras and a plurality of video viewing stations, each viewing station equipped with a video monitor and a remote selector switch. The selector switch has a unique state corresponding to each video camera. A central switching station is electronically connected to the cameras, the monitors and the remote selector switches. This central switching station includes a plurality of electrical switching means each associated with a different one of the viewing stations. Each of the electrical switching means is controlled by the selector switch of its associated viewing station. The electrical switching means for each station serves to connect in random access any selected one of the video camera to the monitor of said associated viewing station.

It is therefore an object of the invention to provide a surveillance system offering more complete and convenient surveillance and greater flexibility of operation.

Another object of the present invention is to provide an improved video surveillance apparatus and method which permits the completely independent and random selection of a plurality of video camera signals by a plurality of monitoring stations without degradation or variation in signal quality so that a picture of consistent visual quality is maintained.

Another object of the invention is to provide a surveillance system which minimizes the amount of costly coaxial transmission line which is necessary for its operation.

Another object of the invention is to provide a video surveillance system in which the impedance at all points along the signal path remains substantially unchanged for all switching conditions.

Further objects and features of the invention will be apparent from the following specification and claims when considered in connection with the accompanying drawing illustrating the preferred embodiment of the invention.

Figure 1:
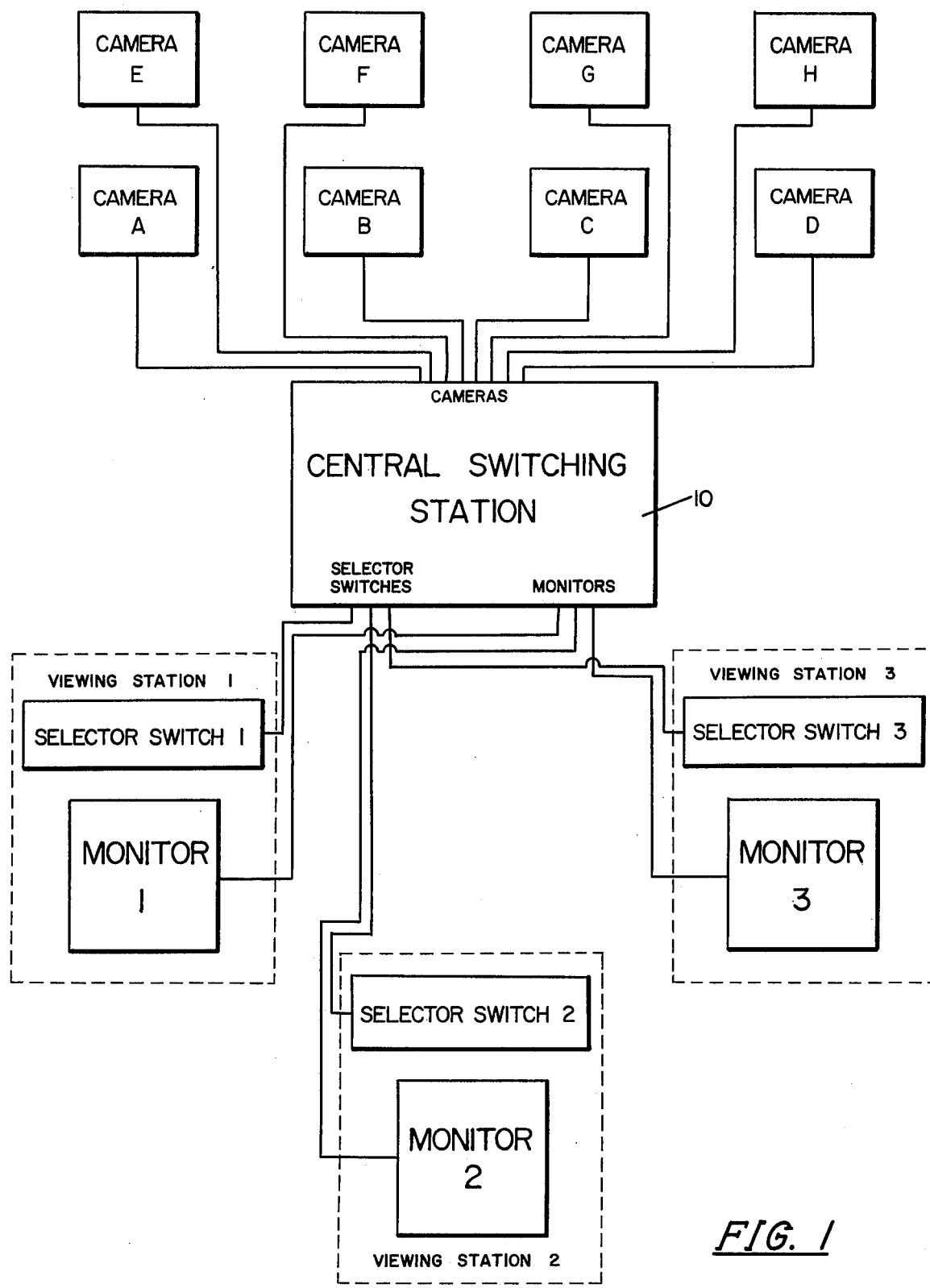
FIG. 1 is a block diagram illustrating the preferred embodiment of the invention.

In describing the preferred embodiment of the invention illustrated in the drawings, specific terminology will be resorted to for the sake of clarity. However, the invention is not intended to be limited to the specific terms so selected and it is to be understood that each specific term includes all technical equivalents which operate in a similar manner to accomplish a similar purpose. For example, the term "connection" indicates effective connection and is not limited to direct connection where the connection through other circuit elements is known to be equivalent by those skilled in the art.

DETAILED DESCRIPTION

FIG. 1 illustrates eight video cameras labelled cameras A-H each separately connected by coaxial cable to a central switching station 10. These video cameras are physically located at and directed toward a variety of areas to be maintained under surveillance. For example, cameras A-H might be aimed toward different areas of a factory or warehouse or the like. Each camera is connected by its own single coaxial cable to the central switching station 10. The cameras ae not connected to each other nor are they connected directly to any viewing stations. All video camera signals are therefore collected at the central switching station 10. The term "central" refers to the electrical connection of the switching station as the hub of the system rather than its physical location in a building under surveillance.

The cameras may be located at a great variety of distances from the master station. One camera, for example, may actually monitor the area surrounding the central switching station itself while other cameras may be very distant from the central switching station. In practice the distance from the central switching station commonly varies, for example, from 20 feet to 350 feet.

A plurality of viewing stations labelled viewing station 1 to viewing station 3 are also positioned at different physical locations. For example, one might be located in the security office of the factory, another in the executive offices and a third at a main entrance. Each viewing station includes a selector switch and a video monitor associated with that station. Each of the monitors are connected by a single coaxial transmission line to the central switching station 10. Each of the selector switches are connected by a multi-conductor, low frequency cable to the central switching station 10. Each remote selector switch has a unique state corresponding to each video camera as described more fully below.

Although we have illustrated eight cameras and three viewing stations, the present invention contemplates a plurality of any number of cameras as well as a plurality of any number of viewing stations. Regardless of how many cameras and viewing stations are used, each camera is connected by a single coaxial transmission line to the central switching station. Each viewing station is connected by a two-cable system to the central switching station 10. One cable from the viewing station is a coaxial transmission line connected to the monitor and the other is a multi-conductor low frequency cable.

The central switching station 10 includes a plurality of electrical switching means each associated with a different one of the viewing stations. Each of these electrical switching means is controlled by the selector switch of its associated viewing station and operates to connect in random access any selected one of the cameras to the monitor of its associated viewing station.

Therefore, the method for switching and monitoring the plurality of video cameras at a plurality of viewing stations begins with the feeding of a signal from each camera to a central switching station through a separate transmission line for each camera. A selected camera signal may be fed from the central switching station to a monitor located at a viewing station through a separate transmission line for each monitor. The signals are selected by switching the incoming camera signals to the monitors the switching accomplished within the central switching station by remote control from the viewing stations.

Remote control of the central switching station 10 at each of the viewing stations avoids the necessity of simultaneously feeding all camera signals to all viewing stations over expensive coaxial transmission lines.

Figure 2:
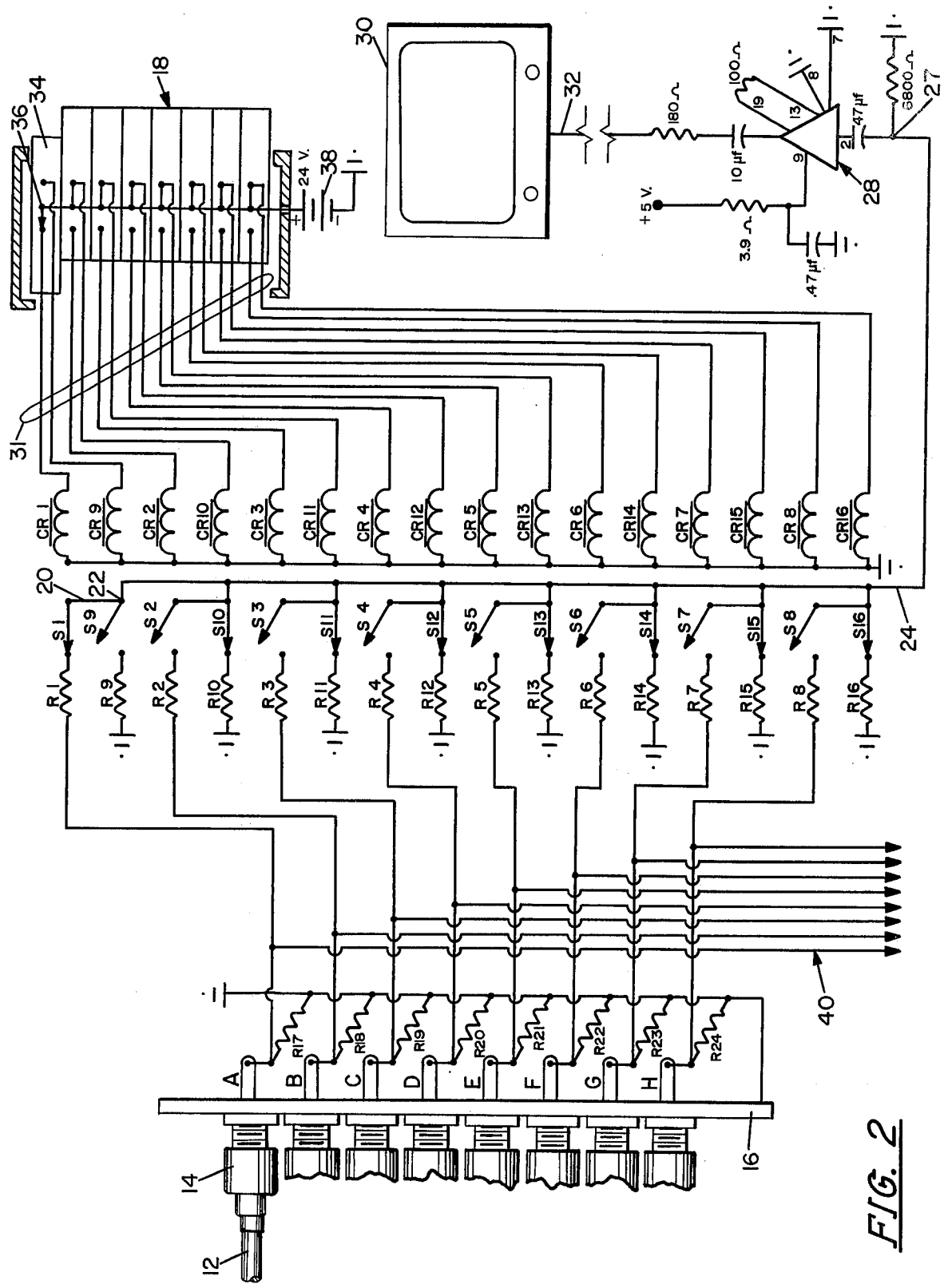
FIG. 2 is a schematic diagram illustrating the embodiment of the invention shown in FIG. 1.

FIG. 2 illustrates the schematic diagram of a portion of the preferred embodiment of the invention. The coaxial cables, such as coaxial cable 12 are connected to conventional coaxial cable connectors such as connector 14 and brought together at a video camera output collecting panel 16. Each camera output signal is shunted within the central switching station 10 by a terminating resistance indicated as R17 through R24. In a typical system having a 75 ohm characteristic impedance, each of the resistances R17 through R24 may, for example, be 82 ohm resistors. The signals from these cameras are connected through coupling resistors R1-R8 to switches S1-S8. In the preferred embodiment of this invention these switches S1 through S8 like their associated switches S9 through S16 are the switches of a multiplicity of contact relays having associated coils CR1 through CR16.

These contact relays illustrated in FIG. 2 together comprise the electrical switching means which is remotely controlled by the associated selector switches 18 located at an associated viewing station. Of course, switching devices other than relays may be utilized. For example, reed type switches and relays and solid state electronic switching devices may also be used. Other electrical switching means (identical to CR1–CR16 and S1–S16) and their associated viewing stations are connected at lines 40 in the same manner.

Each of the single-pole, single-throw switches S1 through S8 is paired with a similar single-pole, single-throw switch S9 through S16. For example, the switch S1 is paired with the switch S9 while the switch S8 is paired with the switch S16. These associated pairs of switches are connected together to effectively form and function as a single-pole, double-throw switch. For example, the switches S1 and S9 are connected together by a conductor 20 and have an effective wiper terminal 22. Thus, when the switch S1 is closed, the switch S9 is open. Similarly, when the S2 is closed the switch S10 is open. Inversely, when the switch S1 is open the switch S9 is closed etc.

The effective wiper terminals, such as terminal 22, are all connected together by a conductor 24 which in turn is connected to the input 27 of a video amplifier 28 located within the central switching station 10. A video monitor 30 is in turn connected to the output of the video amplifier 28 through a coaxial cable transmission line 32 extending from the central switching station 10 to the associated viewing station.

Thus, each of the associated pairs of switches of the contact relays either a camera output through a coupling resistor to the video amplifier 28 or in the alternative connect the common conductor 24 to ground through one of the resistors R9 through R16.

For example, switches S1 and S9 can either connect the camera A through resistance R1 to the input 27 of the video amplifier 28 or alternatively connect the common conductor 24 to groung through resistance R9. Similarly, switches S2 and S10 can, in the alternative, either connect camera B through coupling resistor R2 to the input of the video amplifier 28 or connect the common conductor 24 to ground through resistance R10.

The preferred selector switch 18, remotely located at a viewing station, is a linearly arranged series of depressible single-pole, double-throw push button switches.

The conductors extending from the selector switch 18 to the relay coils CR1 through CR16 extend together in a cable indicated as 31 from the associated viewing station to the central switching station. The number of operationally utilized, depressible push buttons is equal to the number of video cameras so that each push button corresponds to the selection of a different camera signal. The push button switch is mechanically constructed so that the depression of any one button automatically resets any other depressed button to its undepressed state. Therefore, the selector switch 18 has a unique state corresponding to each of the cameras. Such state is accomplished in each case by depression of a different particular button.

The push button wiper terminals for all the push button switches, such as terminal 36 of push button 34, are connected together and to a source of power 38 for driving the relay coils CR1 through CR16. When any particular push button is depressed it energizes one of its associated relay coils which will be one of the coils CR1 through CR8. For example, when push button 34 is depressed it energizes its associated relay coil CR1. Similarly, when any push button is reset to an undepressed state, it energizes its other associated relay coil which will be one of the coils CR9 through CR16. For example, when push button 34 is reset it energizes the relay coil CR9 associated with switch S9.

In the preferred embodiment of the invention, the resistors R1 through R16 switches S1 through S16 and relay coils CR1 through CR16, along with video amplifier 28 are all mounted on a printed circuit card in the central switching station 10. This card is associated with the viewing station at which selector switch 18 and video monitor 30 are together located. One such printed circuit card is associated with each viewing station. Consequently, similar cards corresponding to other viewing stations are analogously connected to cameras A through H by means of conductors 40.

The video amplifier 28 is designed so that it has a relatively high input impedance and an output impedance which is substantially matched to the characteristic impedance of the video monitor 30. For example, a video amplifier was constructed according to the present invention having an input impedance of approximately 80 K ohms and an output impedance of approximately 75 ohms. Such an amplifier may be designed according to conventional techniques and the amplifier illustrated was constructed from an operational amplifier NE 501.

Terminating resistors R17 through R24 were used in an embodiment of the invention with each having an identical resistance of 82 ohms. These were used with video cameras having a characteristic output impedance of 75 ohms. Resistances R1 through R16 were used each of which had an identical value of 10 K ohms.

The operation of the preferred embodiment of the invention illustrated in FIG. 2 may be initially observed when no push buttons of the selector switch 18 are depressed. In that condition switches S1 through S8 are all open so that coupling resistors R1 through R8 are all unconnected to any of the switches. In this state, the circuit does not load the camera outputs. Also in this state, the eight resistors R9 through R16 are connected in parallel between ground and the input 27 of the video amplifier 28. In the preferred embodiment of the invention utilizing 10 K ohm resistors for resistors R1 through R16, these parallel resistors present a net impedance of 1250 ohms to the input 27 of the video amplifier 28.

If a selector push button such as push button 34 is now depressed as illustrated in FIG. 2, switch S1 connects the signal from video camera A through coupling resistance R1 and common conductor 24 to the input 27 of the video amplifier 28. Since resistance R1 is more than two orders of magnitude greater than the parallel net impedance of resistance R17 and the video camera output circuit, resistance R1 is effectively connected to ground. Therefore the impedance effectively presented to the input of the video amplifier 28 remains substantially unchanged. Effectively R1 is substituted for R9. Therefore, although the depression of push button 34 connects the signal from video camera A to the input 27 of the video amplifier 28, nonetheless the impedance placed across the input of video amplifier 28 remains substantially unchanged. The depression of any other push button of the selector switch 18 would cause push button 34 to be reset and a different camera signal to be connected to the input 27 of the video amplifier 28. However, the net impedance presented to the input of the video amplifier 28 would still remain essentially 1250 ohms.

It may also be observed that the switching circuitry illustrated in FIG. 2 has no significant loading effect upon the camera outputs. This is true because the terminating resistances R17 through R24 are each at least an order of magnitude smaller than the impedance connected to the camera output by the switching circuit. For example, with push button 34 depressed to connect the signal from camera A to the input 27 of the video amplifier 28, the switching circuit illustrated in FIG. 2 will shunt an effective loading impedance across terminating resistance R17. This effective loading impedance will be a circuit consisting of resistor R1 in series with the parallel combination of R10 through R16 and the input impedance of the video amplifier 28. In the preferred embodiment of the invention this total effective loading impedance would approximate 12 K ohms. Such a 12 K ohm load will have a negligible effect when connected in shunt with an 82 ohm resistance.

If all the viewing stations were similarly connected to any one camera, nonetheless within the limits of a reasonable number of viewing stations, the camera will not be significantly loaded. For example, if there are three such viewing stations and all are connected to receive the signal from camera A then the total effective loading impedance connected in shunt with R17 will be 4 K ohms. This is still more than an order of magnitude larger than R17.

Therefore, complete random access is available regardless of the selections made at the various viewing stations. Picture quality remains good because switching has no appreciable effect on circuit conditions.

It is to be understood that while the detailed drawings and specific examples given describe the preferred embodiments of the invention, they are for the purpose of illustration only, that the apparatus of the invention is not limited to the precise details and conditions disclosed and that various changes may be made therein without departing from the spirit of the invention which is defined by the following claims.

What is claimed is:

1. A video surveillance apparatus comprising:
   a. a plurality of video cameras;
   b. a plurality of video viewing stations, each station equipped with a video monitor and a remote selector switch comprising means for controlling the exhibition of video signals from any selected camera; and
   c. a central Master Video Switcher in direct electronic communication with each of said cameras, said monitors, and said remote selector switches, said central Video Switcher including a plurality of electrical switching means each associated with a different one of said viewing stations, each of said electrical switching means being remotely controlled by the selector switch of an associated viewing station for connecting in selected random access any selected one of said video cameras to the monitor of its associated viewing station independently of any connection between said camera or any other camera with any other viewing station.

2. The video surveillance apparatus of claim 1, having:
means for providing a substantially constant load impedance for said video cameras.

3. An apparatus according to claim 1 wherein the central Master Video Switcher is in direct electronic communication with each of said cameras by means of a separate coaxial cable.

4. An apparatus according to claim 1 wherein the central Master Video Switcher is in direct electronic communication with each of said monitors by means of a separate coaxial cable.

5. An apparatus according to claim 1 wherein the central Master Video Switcher is in direct electronic communication with each of said cameras by means of a separate coaxial cable and is in direct electronic communication with each of said monitors by means of a separate coaxial cable and wherein the electrical switching means of the central Master Video Switcher is remotely controlled from any of said viewing stations by multiconductor low frequency cable.

6. An apparatus according to claim 1 wherein said central Master Video Switcher includes resistance means to minimize distortion even though a plurality of said monitors are in direct electronic communication through said central Master Video Switcher with a single camera.

7. A video surveillance apparatus comprising:
a. a plurality of video cameras;
b. a plurality of video viewing stations each station equipped with a video monitor and a remote selector switch having a unique state corresponding to each video camera; and
c. a central switching station in direct electronic communication with each of said cameras, said monitors and said remote selector switches, said central switching including a plurality of electrical switching means each associated with a different one of said viewing stations, each of said electrical switching means being remotely controlled by the selector switch of its associated viewing station for connecting in random access any selected one of said video cameras to the monitor of its associated viewing station;
wherein each of said electrical switching means includes a plurality of single-pole, single-throw electrical switching devices, each of said switching devices having a pair of switching terminals and a control input terminal, one switching terminal of each switching device being connected to corresponding switching terminals of the other switching devices and to the associated monitor, the other switching terminal of each switching device being connected to a different one of said cameras, and each of said control input terminals being connected to the associated remote selector switch for actuating a different one of said switching devices in response to a selected unique state of the associated selector switch.

8. A video surveillance apparatus comprising:
a. a plurality of video cameras;
a plurality of video viewing stations each station equipped with a video monitor and a remote selector switch having a unique state corresponding to each video camera; and
c. a central switching station in direct electronic communication with said cameras, said monitors and said remote selector switches, said central switching including a plurality of electrical switching means each associated with a different one of said viewing stations, each of said electrical switching means being remotely controlled by the selector switch of its associated viewing station for connecting in random access any selected one of said video cameras to the monitor of its associated viewing station;
wherein each of said electrical switching means comprises: a plurality of effective single-pole, double-throw switching devices, each having a wiper terminal, a pair of switching terminals alternatively connectible to said wiper terminal and having a control input terminal, wherein the wiper terminals of each of said switching devices are connected together and to the associated monitor, and wherein a corresponding switching terminal of each of said switching devices is connected through a different associated resistance to a common ground and wherein the other switching terminal of each of said switching devices is connected through a coupling impedance to a different one of said cameras whereby each of said cameras is alternatively connectible to the associated monitor and to a resistance.

9. An apparatus according to claim 8 wherein said different associated resistances and said coupling impedances are all resistors having a substantially identical impedance.

10. An apparatus according to claim 9 wherein each of said cameras is connected to said common ground through terminating resistances of substantially identical impedances and wherein the impedance of each of said different associated resistances is at least ten times the product of the number of viewing stations and the impedance of any terminating resistance.

11. An apparatus according to claim 10 wherein a video amplifier is provided in the central switching station interposed in the connection between each monitor and its associated switching means, said video amplifier having an input impedance substantially higher than the impedance of said coupling impedance and an output impedance substantial matched to the input impedance of a monitor.

12. An apparatus according to claim 11 wherein each of said effective single-pole, double-throw switching devices comprises a pair of single-pole, single-throw relays having an interconnected switch terminal and wherein each of said selector switches comprises a plurality of single-pole, double-throw push button switches connected to a source of electrical power and a conductor means for permitting alternative actuation of each of said relay pairs by a different one of said single-pole, double-throw selector switches.

* * * * *